(12) United States Patent
Hsu

(10) Patent No.: US 10,331,872 B2
(45) Date of Patent: Jun. 25, 2019

(54) ELECTRONIC DEVICE AND PASSWORD ENTERING METHOD

(71) Applicant: Chiun Mai Communication Systems, Inc., New Taipei (TW)

(72) Inventor: Cheng-Jung Hsu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 178 days.

(21) Appl. No.: 15/163,629

(22) Filed: May 24, 2016

(65) Prior Publication Data

US 2017/0039360 A1 Feb. 9, 2017

(30) Foreign Application Priority Data

Aug. 4, 2015 (CN) .......................... 2015 1 0472429

(51) Int. Cl.
G06F 3/0484 (2013.01)
G06F 21/36 (2013.01)
G06F 3/01 (2006.01)
H04M 1/673 (2006.01)

(52) U.S. Cl.
CPC .............. *G06F 21/36* (2013.01); *G06F 3/016* (2013.01); *H04M 1/673* (2013.01); *G06F 2203/04808* (2013.01); *H04M 2250/22* (2013.01)

(58) Field of Classification Search
USPC .......... 726/18, 2, 21, 36; 713/150, 163, 181; 380/255, 264, 276
See application file for complete search history.

(56) References Cited

U.S. PATENT DOCUMENTS

| | | | | |
|---|---|---|---|---|
| 2010/0085216 A1* | 4/2010 | Ms | ........................... | G06F 3/043 341/20 |
| 2013/0021276 A1* | 1/2013 | Bang | ................. | H04M 1/72563 345/173 |
| 2015/0106887 A1* | 4/2015 | Aslund | ............... | H04L 63/0492 726/5 |
| 2015/0113633 A1* | 4/2015 | Yeom | .................... | H04L 63/083 726/18 |
| 2015/0199016 A1* | 7/2015 | Suzuki | .................... | G06F 21/31 345/173 |
| 2016/0026784 A1* | 1/2016 | Zheng | ..................... | G06F 21/36 726/19 |

FOREIGN PATENT DOCUMENTS

| | | |
|---|---|---|
| CN | 102314295 A | 1/2012 |
| CN | 102638342 A | 8/2012 |
| CN | 103079000 B | 12/2014 |

* cited by examiner

*Primary Examiner* — Sharif E Ullah
(74) *Attorney, Agent, or Firm* — ScienBiziP, P.C.

(57) ABSTRACT

A password entering method executed by at least one processor of an electronic device is provided. The electronic device includes a touch device, a storage device and a vibration device. The method includes detecting at least one stable touch on the touch device. For each of the detected stable touch, the number of vibrations produced by the vibration device according to a preset vibration frequency is counted. And the electronic device is controlled to perform a preset function when the at least one number of vibrations matches with a preset password code stored in the storage device.

15 Claims, 7 Drawing Sheets

ELECTRONIC DEVICE AND PASSWORD ENTERING METHOD

CROSS REFERENCE TO RELATED APPLICATIONS

This application claims priority to Chinese Patent Application No. 201510472429.5 filed on Aug. 4, 2015, the contents of which are incorporated by reference herein.

FIELD

The subject matter herein generally relates to an electronic device and a password entering method.

BACKGROUND

A touch screen of an electronic device can be unlocked using a variety of unlocking mechanisms to ensure the safety of information, including entering a password or a sliding touch in a specific pattern across the touch screen. However, the factory unlocking mechanisms are easy and can be remembered by other people who see a movement on the touch screen.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
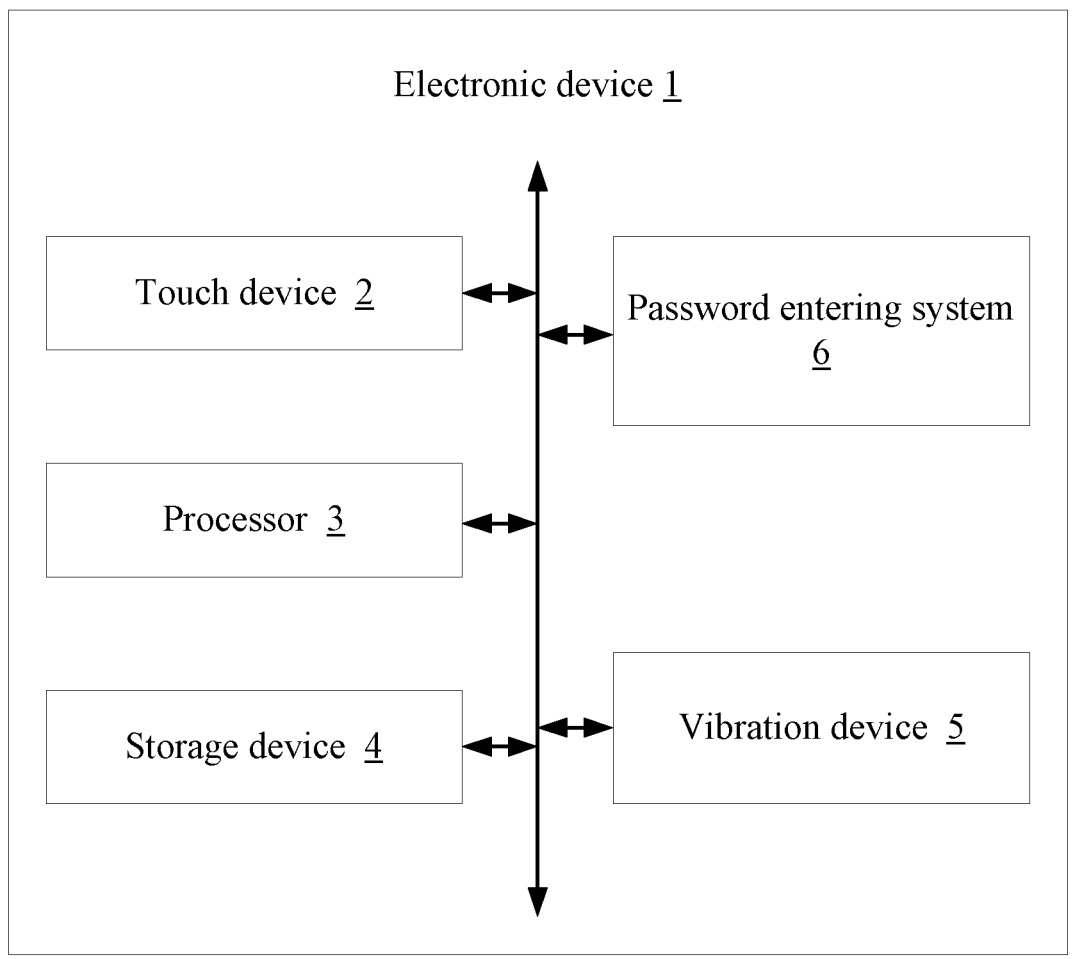
FIG. 1 is a block diagram of an exemplary embodiment of an electronic device.
Figure 2A:
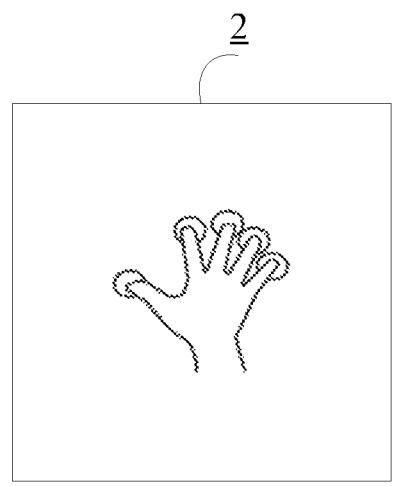
FIG. 2A, FIG. 2B, FIG. 2C, and FIG. 2D respectively illustrate an exemplary embodiment of a password area having a shape of hand, an exemplary embodiment of a password area having a shape of a matrix of rectangles, an exemplary embodiment of a password area having a shape of a row of rectangles an exemplary embodiment of a password area having a shape of a column of rectangles.
Figure 2B:
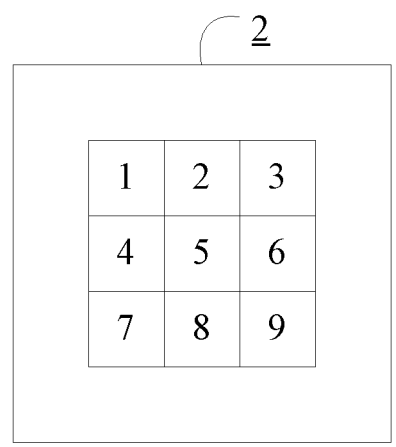
Figure 2C:
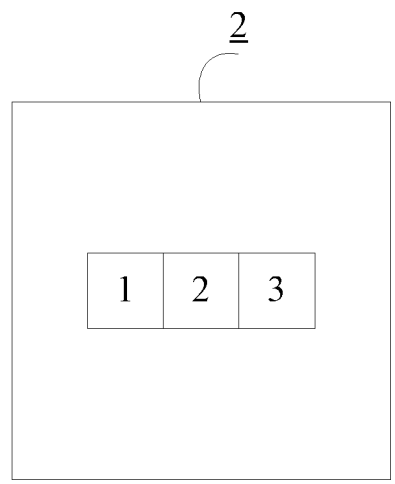
Figure 2D:
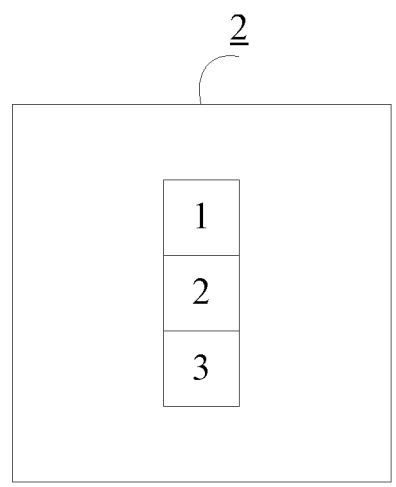

It will be appreciated that for simplicity, and clarity of illustration, where appropriate, reference numerals have been repeated among the different figures to indicate corresponding or analogous elements. In addition, numerous specific details are set forth in order to provide a thorough understanding of the embodiments described herein. However, it will be understood, by those of ordinary skill in the art that the embodiments described herein can be practiced without these specific details, in other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiments and such references mean "at least one."

The term "module", as used herein, refers to logic embodied in hardware or firmware, or to a collection of software instructions, written in a programming language, such as, lava, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY™, flash memory, and hard disk drives. The term "comprising" means "including, but not necessarily limited to"; it specifically indicates open-ended inclusion or membership in a so-described combination, group, series and the like.

FIG. 1 is a block diagram of an exemplary embodiment of an electronic device. In at least one embodiment as shown in FIG. 1, the electronic device 1 includes, but is not limited to, a touch device 2, at least one processor 3, a storage device 4, a vibration device 5 and a password entering system 6. The electronic device 1 can be a mobile phone, a tablet computer, a personal, digital assistant, a notebook computer, a computerized lock, or any other device subject to a security password (e.g., automobile door lock). FIG. 1 illustrates only one example of the electronic device, other examples can include more or fewer components than as illustrated, or have a different configuration of the various components in other embodiments.

In at least one embodiment, the touch device 2 can detect touches input by a user, and generate commands corresponding to the touches. The touch device 2 can include one or more hardware components which are capable of sensing touches. For example, the touch device 2 can include a touch panel or a touch screen. The touch device 2 can also include physical buttons on the electronic device 1. The touch device 2 can further include a remote-controller of the electronic device 1. In another embodiment, the touch device 2 can detect stable touches of the user. The phrase "stable touch" means a touch on the touch device 2 whose status does not change throughout that touch. There are more detailed discussions below about the stable touches.

In at least one embodiment, when the touch device 2 includes a touch screen, the touch device 2 can display one or more areas configured to receive password inputs (hereinafter referred to as password areas), as for example shown in FIG. 2. The password areas can be displayed as a "hand" shape (shown in FIG. 2A), a matrix of rectangles (shown in FIG. 2B), a row of rectangles (shown in FIG. 2C), a column of rectangles (shown in FIG. 2D), or any other shape or arrangement. The password areas can be rectangular shapes, circular shapes, triangular shapes, star shapes, graphic icons, or cartoon pictures to make the password entering interesting and enhance the user experience. In some embodiments, the touch device 2 does not display any password area.

In at least one embodiment, the at least one processor 3 can be a central processing unit (CPU), a microprocessor, or other data processor chip that performs functions of the password entering system 6.

In at least one embodiment, the storage device 4 can include various types of non-transitory computer-readable storage mediums. For example, the storage device 4 can be an internal storage system, such as a flash memory, a random access memory (RAM) for temporary storage of information, and/or a read-only memory (ROM) for permanent storage of information. The storage device 4 can also be an external storage system, such as a hard disk, a storage card, or a data storage medium. In some embodiments, the storage device 4 can store data such as a preset password code and preset vibration frequencies of the vibration device 5.

In at least one embodiment, the vibration device 5 can produce vibrations when a stable touch on the touch device 2 is detected.

Figure 3:
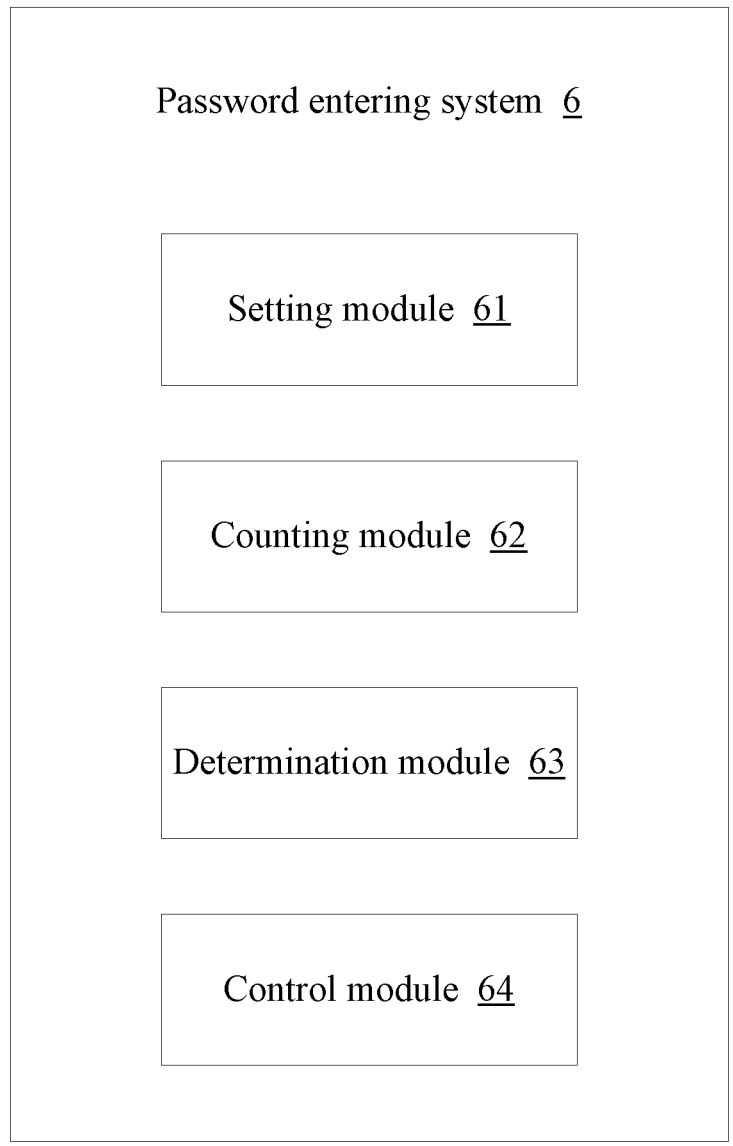
FIG. 3 is a block diagram of an exemplary embodiment of function modules of a password entering system.

FIG. 3 is a block diagram of one embodiment of function modules of the password entering system 6. In at least one embodiment, the password entering system 6 can include a setting module 61, a counting module 62, a determination module 63, and a control module 64. The function modules 61, 62, 63, and 64 can include computerized codes in the form of one or more programs which are stored in the storage device 4. The at least one processor 3 executes the computerized codes to provide functions of the modules 61-64.

The setting module 61 can preset a password code.

The preset password code can include one or mote password numbers. The preset password code can lock the entire electronic device 1 or one or more resources of the electronic device 1.

The setting module 101 can further preset frequencies of vibration (hereinafter referred to as vibration frequencies) for the vibration device 5 during a stable touch on the touch device 2. The preset password code and the preset vibration frequencies are stored in the storage device 4.

A user may touch the touch device 2 with his fingers, but touches are not limited to fingers. In some embodiments, the user can touch the touch device 2 with other part of his/her body or with a stylus.

In at least one-embodiment, only one vibration frequency is preset so that a stable touch of the user on the touch device 2 always produces the same vibration frequency. The single preset vibration frequency can be default and can be stored in the storage device 4 or stored at another location in the electronic device 1.

In at least one embodiment the setting module 101 can preset at least one vibration frequency or at least one range of vibration frequencies. Every time the user performs a stable touch on the touch device 2, the setting module 101 can select a vibration frequency from the at least one preset vibration frequency or from, the preset range of vibration frequencies. The setting module 101 can select different vibration frequencies or select the same vibration frequency for the vibration device 5 to produce vibrations for subsequent stable touches on the touch device 2. That is to say, the vibration frequency selected for a stable touch can be the same as or different from the vibration frequency selected for the previous stable touch.

In at least one embodiment, the touch device 2 can include a pressure sensor to sense pressure on the touch device 2. The setting module 61 can select vibration frequencies, according to different pressures. The vibration frequency selected for the vibration device 5 can be directly proportional to or inversely proportional to the pressure sensed by the pressure sensor.

In one embodiment, the counting module 62 can count the number of vibrations produced by the vibration device 5 according to the preset vibration frequencies during every stable touch on the touch device 2.

In another embodiment, the counting module 62 can calculate the number of vibrations produced by the vibration device 5 according to the preset vibration frequencies during every stable touch on the touch device 2, and then, the number of vibrations is regarded as an input number of the corresponding stable touch and the input number is stored into the storage device 4 for password matching.

In one embodiment, the determination module 63 can determine whether the numbers of vibrations of the stable touches match with the password numbers of the preset password code stored in the storage device 4.

In another embodiment, the determination module 63 can determine whether the input numbers of the stable touches match with the password numbers of the preset password code stored in the storage device 4.

The control module 104 can control the electronic device 1 to perform a preset function before and after any password matching.

In some embodiments, the preset functions of the electronic device 1 can include unlocking the electronic device 1 or unlocking resources of the electronic device 1. Unlocking the electronic device 1 means that the electronic device 1 can be fully accessed or used. Unlocking the resources of the electronic device 1 means that one or more resources of the electronic device 1 can be accessed or used. The resources can include, but are not limited to, documents, application programs, hardware of the electronic device 1, or other functions of the electronic device 1, such as photographing function, locating function, and network connecting function. Thus, after the aforementioned unlocking, the user can use at least some parts of the electronic device 1.

Figure 4:
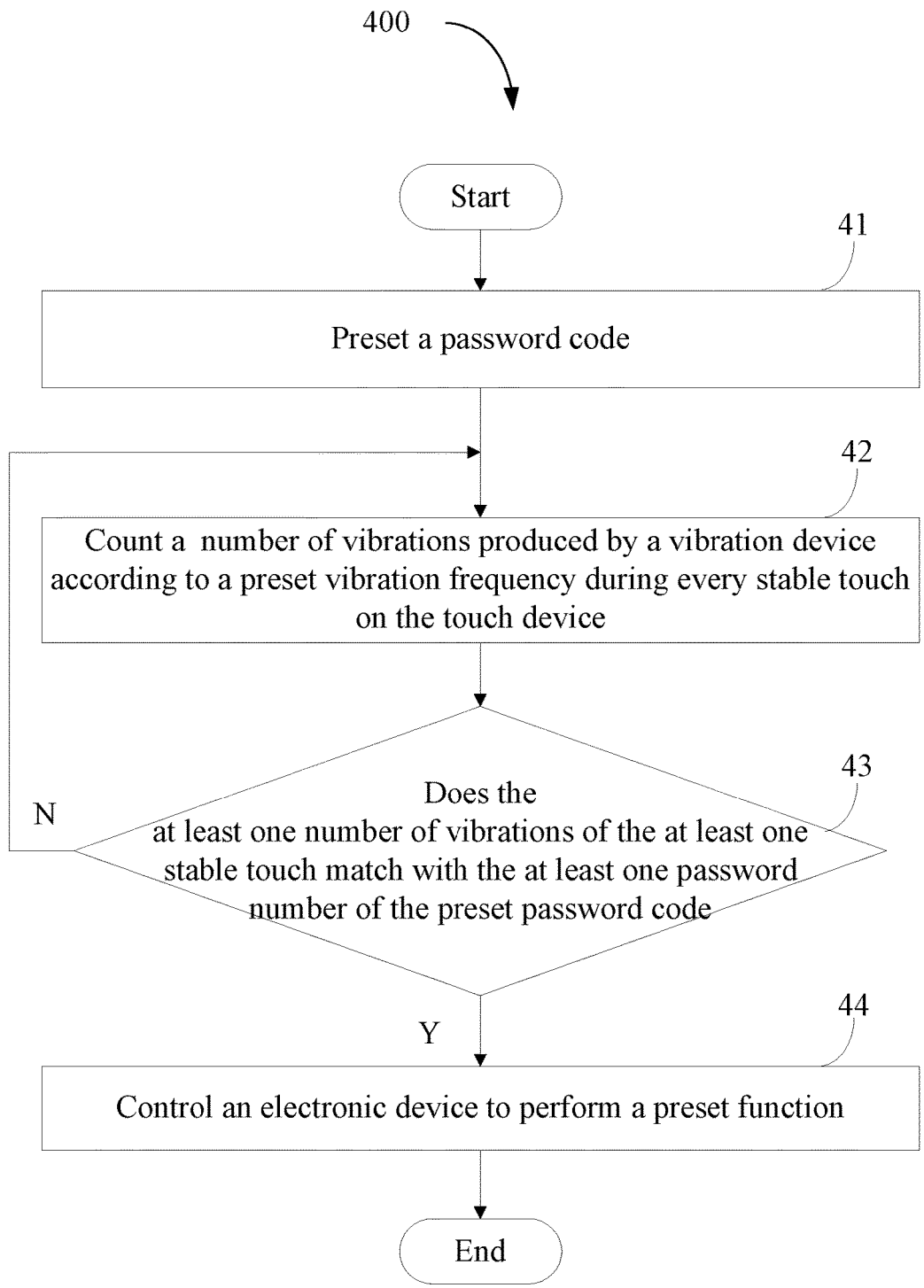
FIG. 4 is a flowchart of an exemplary embodiment of an entering method for password.

FIG. 4 illustrates a flowchart in accordance with an example embodiment. An example method 400 is provided by way of example, as there are a variety of ways to carry out the method. The example method 400 described below can be carried out using the configurations illustrated in FIG. 1 and FIG. 3, and various elements of these figures are referenced in explaining the example method. Each block, shown in FIG. 4 represent one or more processes, methods, or subroutines carried out in the example method 400. Furthermore, the illustrated order of blocks is illustrative only and the order of the blocks can be changed. The example method 400 can begin at block 41. Depending on the embodiment, additional blocks can be utilized and the ordering of the blocks can be changed.

At block 41, a setting module presets a password code. The preset password code can include one or more password numbers.

At block 42, a counting module counts a number of vibrations produced by the vibration device 5 according to a preset vibration frequency during every stable touch on the touch device 2. The user may perform, one or more stable touches on the touch device 2.

At block 43, a determination module determines whether the at least one number of vibrations of the at least one stable touch matches with the at least one password number of the preset password code stored in the storage device 4. When a determination is made that the at least one number of vibrations matches with the at least one password number of the preset password code, the process goes to block 44. When a determination is made that the at least one number of vibrations does not match with the at least one password number of the preset password code, the process returns to block 42.

In some embodiments, when a determination is made that the at least one number of vibrations does not match with the at least one password number of the preset password code, the process ends. In some embodiments, when the number of times of consecutive mismatches between the at least one number of vibrations and the at least one password number of the preset password code reaches a predetermined number of times (e.g., three times), the process ends.

At block 44, a control module controls the electronic device 1 to perform a preset function.

Alternatively, at the block 42, a counting module inputs an input number of each, stable touch into the storage device 4, wherein the input number corresponds to the number of vibrations of the corresponding stable touch. Correspondingly, at the block 43, a determination module determines whether the at least one input number matches with the at least one password number of the preset password code stored in the storage device 4. When a determination is made that the at least one input number matches with the at least one password number of the preset password code, the process goes to block 44. When the at least one input number does not match with the at least one password number of the preset password code, the process returns to the alternatively block 42.

The following provides several example embodiments of executing the password entering method. The method is not limited to the several example embodiments. The phrase "stable touch" means a touch on the touch device 2 whose status of touch does not change throughout that touch. The status of the touch can be represented by the positions and the quantity of touch points on the touch device 2. If the position of at least one of the touch points changes or the quantity of the touch points changes, it is determined that the status of the touch changes and that touch is no longer a stable touch. When the status of a touch on the touch device 2 remains unchanged for a preset time duration, the counting module 62 determines that the touch becomes a stable touch and the vibration device 5 begins to produce vibrations. The stable touch, ends when its status changes.

For example, when the user slides a linger on the touch device 2, the position of the touch keeps changing and the touch is not a stable touch. When the user touches the touch device 2 with two fingers, the quantity of touch points is determined as two. When the user touches the touch device 2 with four fingers, the quantity of the touch points is determined as four. When the user touches the touch device 2 with two fingers and presses one of the physics buttons at the same time, the quantity of the touch points is determined as three. When the user touches the touch device 2 with two fingers and presses two of the physics buttons at the same time, the quantity of the touch points is determined as four. When the user touches the touch device 2 with one finger and simultaneously touches the touch device 2 with a stylus and presses one of the physics buttons, the quantity of the touch points is determined as three. When the user does not touch the touch device 2 or the physical buttons, the quantity of the touch point is determined as zero.

Each stable touch starts with a change of status of touch, and ends with the next change of status of touch. That is, a stable touch may be defined as a touch or a period between two consecutive changes of status of touch. When the counting module 62 detects a stable touch, the counting module 62 controls the vibration device 5 to produce vibrations according to the preset vibration frequencies.

In the first embodiment, the touch device 2 does not display any password area. The setting module 61 presets a password code, for example, "45132". The password code "45132" includes five password numbers, namely, "4", "5", "1", "3" and "2". Accordingly, for entering the password code "45132", the user perform five stable touches on the touch device 2. For example, the user touches the touch device 2 for the first time, and then takes the fingers away after the vibration device 5 produces four vibrations. The counting module 62 counts the number of vibrations (4) or generates an input number "4" for the first stable touch. The user touches the touch device 2 for the second time, and then takes the fingers away after the vibration device 5 produces five vibrations. The counting module 62 counts the number of vibrations (5) or generates an input, number "5" for the second stable touch. The user touches the touch device 2 for the third time, and then takes the fingers away after the vibration device 5 produces one vibration. The counting module 62 counts the number of vibration (1) or generates an input number "1" for the third stable touch. The user touches the touch device 2 for the fourth time, and then takes the fingers away after the vibration device 5 producing three vibrations. The counting module 62 counts the number of vibrations (3) or generates an input number "3" for the fourth stable touch. The user touches the touch device 2 for the fifth time, and then takes the fingers away alter the vibration device 5 produces two vibrations. The counting module 62 counts the number of vibrations (2) or generates an input number for the fifth stable touch. The determination module 63 arranges the numbers of vibrations or the input numbers of the five stable touches in order of touch to generate an input code, and then determines whether the input code matches with the preset password code. The control module 64 controls the electronic device 1 to perform a preset function if the input code matches with the preset password code.

In the aforementioned first embodiment, the user may touch the same position or different positions on the touch device 2 in each stable touch.

In the second embodiment, the touch device 2 does not display any password area. The setting module 61 presets a password code, for example, "45132". The password code "45132" includes five password numbers, namely, "4", "5", "1", "3" and "2". Accordingly, for entering the password code "45132" the user performs five stable touches on the touch device 2. For example, the user touches the first position cm the touch device 2 with one finger for the first time, and then takes the finger away after the vibration device 5 produces four vibrations. The user slides the finger to the second position on the touch device 2. The counting module 62 counts the number of vibrations (4) or generates an input number "4" for the first stable touch. When the user keeps the finger on the second position, the vibration device 5 starts to produce vibrations. After the vibration device 5 produces five vibrations, the user slides the finger to the third position. The counting module 62 counts the number of vibrations (5) or generates an input number for the second stable touch. When the user keeps the linger on the third position, the vibration device 5 starts to produce vibrations. After the vibration device 5 produces one vibration, the user slides the finger to the fourth, position. The counting module 62 counts the number of vibration (1) or generates an input number "1" for the third stable touch. The rest, can be done in the same manner. The determination module 63 arranges the numbers of vibrations or the input numbers of the five stable touches in order of touch to generate an input code, and then determines whether the input code matches with the preset password code. The control module 64 controls the electronic device 1 to perform a preset function if the input code matches with the preset password code.

In the aforementioned second embodiment, in the process of entering password, the user touches the touch device 2 without taking fingers away.

In the third embodiment, the touch device 2 displays password areas. For example, the matrix of rectangles as in FIG. 2B, the password areas are numbered from one to nine. The setting module 61 presets a password number "4" for the fourth rectangle, a password number "3" for the second rectangle, and a password number "2" for the fifth rectangle. Accordingly, for entering the password code "432", the user should first touches the fourth grid on the touch device 2, and then touches the second grid, last touches the fifth grid. The setting module 61 also preset a vibration frequency of 0.5 hertz for the vibration device 5 to produce vibrations when the user touches the fourth grid, a vibration frequency of 1.5 hertz for the vibration device 5 to produce vibrations when user touches the second grid, and a vibration frequency of 3 hertz for the vibration device 5 to produce vibrations when the user touches the fifth grid. The user touches the fourth grid with finger for the first stable touch, and takes the finger away after the vibration device 5 produces four vibrations at the frequency of 0.5 hertz. The counting module 62 counts the number of vibrations (4) or generates, an input number for the first stable touch. The user touches the second grid with one linger for the second stable touch, and takes the finger away after the vibration device 5 produces three vibrations at the frequency of 1.5 hertz. The counting module 62 counts the number of vibrations (3) or generates an input number for the second stable touch. The user touches the fifth grid with one finger for the third stable touch, and takes the anger away after the vibration device 5 produces two vibrations at the frequency of 3 hertz. The counting module 62 counts the number of vibrations (2) or generates an input number "2" for the third stable touch. The determination module 61 determines whether the numbers of vibrations or the input numbers match with the preset password code. The control module 64 controls the electronic device 1 to perform a preset function if the numbers of vibrations or the input numbers match with the preset password code.

In the aforementioned third embodiment, the password areas can also be a row of rectangles, a column of rectangles, or any other shape or arrangement, not limited to the matrix. The vibration frequencies at every rectangle can be the same, as or different from each other.

The setting module 61 can preset a password number for every password area displayed on the touch device 2. Alternatively, the setting module 61 can preset password numbers for just a part of the password areas. In some embodiments, the setting module 61 can preset an order of touching the password areas. That is to say, the control module 64 controls the electronic device 1 to perform a preset function only when each number of vibrations or each input number matches with the preset password number of the corresponding password area and the order of touching the pass word areas matches with the preset order. The preset order of touching can be stored in the storage device 4. In some other embodiments, the setting module 61 does not preset an order of touching. In that case, the control module 64 controls the electronic device 1 to perform a preset function when, each number of vibrations or each input number matches with, the preset password number of the corresponding password area. There is no requirement to the order of touching the password areas.

In the fourth embodiment, every stable touch can be demarcated according to a change of the quantity of touch points. In each stable touch, one or more touch points can be increased or decreased. In the process of entering password code, the user keeps at least one touch point. When the quantity of touch point is zero, the process of entering password code ends.

For example, the setting module 61 preset a password code "641". The user firstly touches the touch device 2 with one linger. After the vibration device 5 produces six vibrations, the user touches the touch device 2 with two fingers. The counting module 62 counts the number of vibrations (6) or generates an input number for the first stable touch. After the vibration device 5 produces four vibrations, the user touches the touch device 2 with three fingers. The counting module 62 counts the number of vibrations (4) or generates an input number "4" for the second stable touch. After the vibration, device 5 produces one vibration, the user takes the three lingers away from the touch device 2. The counting module 62 counts the number of vibration (1) or generates an input number "1" for the third stable touch. The determination module 63 arranges the numbers of vibrations or the input numbers of the three stable touches in order of touch to generate an input code, and then determines whether the input code matches with the preset password code. The control module 64 controls the electronic device 1 to perform a preset function if the input code matches with the preset password code.

In the fifth embodiment, the user touches the touch panel and the physical buttons of the touch device 2. The setting module 61 presets a password code, for example, "641." The user firstly touches the touch panel of the touch device 2 with three fingers. After the vibration device 5 produces six vibrations, the user takes one finger away from the touch panel. The counting module 62 counts the number of vibrations (6) or generates an input number "6" for the first stable touch. After the vibration device 5 produces four vibrations, the user touches the touch panel with two fingers and presses one physical button with another finger. The counting module 62 counts the number of vibrations (4) or generates an input number "4" for the second stable touch. After the vibration device 5 produces one vibration, the user takes the three fingers away from the touch panel and the physical button. The counting module 62 counts the number of vibration (1) or generates an input number "1" for the third stable touch. The determination module 63 arranges the numbers of vibrations or the input numbers of the three stable touches in order of touch to generate an input code, and then determines whether the input code matches with the preset password code. The control module 64 controls the electronic device 1 to perform a preset function if the input code matches with the preset password code.

In an embodiment, the user can enter a password code by pressing the physical buttons instead of touching the touch panel or the touch screen of the touch device 2. In this embodiment, the quantity of the touch points is the quantity of the physical buttons pressed by the user.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A computer-implemented method for entering password executed by at least one processor of an electronic device, the electronic device comprising a touch device, a storage device and a vibration device, the method comprising:

detecting at least one stable touch on the touch device, the vibration device producing vibrations when at least one stable touch is detected, the at least one stable touch being a touch on the touch device whose status does not change throughout that touch;

for each of the detected stable touches, counting a number of vibrations produced by the vibration device according to a preset vibration frequency, wherein the touch device comprises a pressure sensor and the preset vibration frequency selected by the at least one processor is directly proportional to or inversely proportional to the pressure sensed by the pressure sensor; and controlling the electronic device to perform a preset function when the at least one number of vibrations matches with a preset password code stored in the storage device, wherein the at least one processor presets at least one vibration frequency or at least one range of vibration frequencies and selects a vibration frequency from the at least one preset vibration frequency or from the preset range of vibration frequencies for the vibration device to produce vibrations for each of the detected stable touch, the preset password code comprises at least one password number, the touch device displays at least one password area and, for each of the stable touch detected in the at least one password area, the at least one processor regards the number of vibrations as an input number of the corresponding stable touch, stores the input number into the storage device, and controls the electronic device to perform the preset function when the at least one input number of the at least one stable touch matches with the at least one password number of the preset password code stored in the storage device, and the password areas comprises a first password area and a second password area, the at least one preset vibration frequency comprise a first frequency and a second frequency, the first frequency is different from the second frequency, the vibration device produces the vibrations according to the first frequency when the stable touch is performed in the first password area, the vibration device produces the vibrations according to the second frequency when the stable touch is performed in the second password area.

2. The method according to claim 1, wherein each of the detected stable touch starts with a change of status of touch and ends with a next change of status of touch.

3. The method according to claim 2, wherein the change of status of touch comprises change of positions and/or a quantity of touch points on the touch device.

4. The method according to claim 1, wherein when the at least one number of vibrations matches with the preset password code and an order of touching the password areas matches with a preset order stored in the storage device, the electronic device is controlled to perform the preset function.

5. The method according to claim 4, wherein the preset function is unlocking the electronic device or unlocking one or more resources of the electronic device.

6. An electronic device, comprising:
a touch device;
a vibration device, the vibration device producing vibrations when at least one stable touch is detected, the at least one stable touch being a touch on the touch device whose status does not change throughout that touch;
at least one processor coupled to the touch device; and
a storage device coupled to the at least one processor and storing one or more programs executable by the at least one processor to cause the at least one processor to:
detect at least one stable touch on the touch device;
for each of the detected stable touches, count a number of vibrations produced by the vibration device according to a preset vibration frequency, wherein the touch device comprises a pressure sensor and the preset vibration frequency selected by the at least one processor is directly proportional to or inversely proportional to the pressure sensed by the pressure sensor; and
control the electronic device to perform a preset function when the at least one number of vibrations matches with a preset password code stored in the storage device, wherein the at least one processor presets at least one vibration frequency or at least one range of vibration frequencies and selects a vibration frequency from the at least one preset vibration frequency or from the preset range of vibration frequencies for the vibration device to produce vibrations for each of the detected stable touch, the preset password code comprises at least one password number, the touch device displays at least one password area and, for each of the stable touch detected in the at least one password area, the at least one processor regards the number of vibrations as an input number of the corresponding stable touch, stores the input number into the storage device, and controls the electronic device to perform the preset function when the at least one input number of the at least one stable touch matches with the at least one password number of the preset password code stored in the storage device, and the password areas comprises a first password area and a second password area, the at least one preset vibration frequency comprise a first frequency and a second frequency, the first frequency is different from the second frequency, the vibration device produces the vibrations according to the first frequency when the stable touch is performed in the first password area, the vibration device produces the vibrations according to the second frequency when the stable touch is performed in the second password area.

7. The electronic device according to claim 6, wherein each of the detected stable touch starts with a change of status of touch and ends with a next change of status of touch.

8. The electronic device according to claim 7, wherein the change of status of touch comprises change of positions and/or a quantity of touch points on the touch device.

9. The electronic device according to claim 6, wherein when the at least one number of vibrations matches with the preset password code and an order of touching the password areas matches with a preset order stored in the storage device, the electronic device is controlled to perform the preset function.

10. The electronic device according to claim 9, wherein the preset function is unlocking the electronic device or unlocking one or more resources of the electronic device.

11. A non-transitory storage medium having stored thereon instructions that, when executed by a processor of an electronic device, causes the processor to perform a controlling method using the electronic device, the electronic device comprising a touch device, a storage device and a vibration device, the method comprising:

detecting at least one stable touch on the touch device, the vibration device producing vibrations when at least one stable touch is detected, the at least one stable touch being a touch on the touch device whose status does not change throughout that touch;

for each of the detected stable touches, counting a number of vibrations produced by the vibration device according to a preset vibration frequency, wherein the touch device comprises a pressure sensor and the preset vibration frequency selected by the at least one processor is directly proportional to or inversely proportional to the pressure sensed by the pressure sensor; and controlling the electronic device to perform a preset function when the at least one number of vibrations matches with a preset password code stored in the storage device, wherein the at least one processor presets at least one vibration frequency or at least one range of vibration frequencies and selects a vibration frequency from the at least one preset vibration frequency or from the preset range of vibration frequencies for the vibration device to produce vibrations for each of the detected stable touch the preset password code comprises at least one password number, the touch device displays at least one password area and, for each of the stable touch detected in the at least one password area, the at least one processor regards the number of vibrations as an input number of the corresponding stable touch, stores the input number into the storage device, and controls the electronic device to perform the preset function when the at least one input number of the at least one stable touch matches with the at least one password number of the preset password code stored in the storage device, and the password areas comprises a first password area and a second password area, the at least one preset vibration frequency comprise a first frequency and a second frequency, the first frequency is different from the second frequency, the vibration device produces the vibrations according to the first frequency when the stable touch is performed in the first password area, the vibration device produces the vibrations according to the second frequency when the stable touch is performed in the second password area.

12. The non-transitory storage medium according to claim 11, wherein each of the detected stable touch starts with a change of status of touch and ends with a next change of status of touch.

13. The non-transitory storage medium according to claim 12, wherein the change of status of touch comprises change of positions and/or a quantity of touch points on the touch device.

14. The non-transitory storage medium according to claim 11, wherein when the at least one number of vibrations matches with the preset password code and an order of touching the password areas matches with a preset order stored in the storage device, the electronic device is controlled to perform the preset function.

15. The non-transitory storage medium according to claim 14, wherein the preset function is unlocking the electronic device or unlocking one or more resources of the electronic device.

* * * * *